United States Patent Office 3,431,462
Patented Mar. 4, 1969

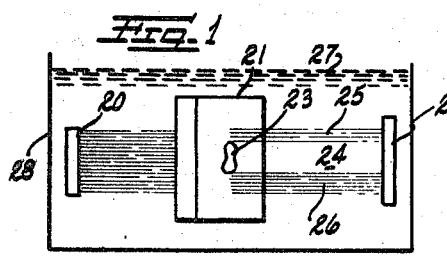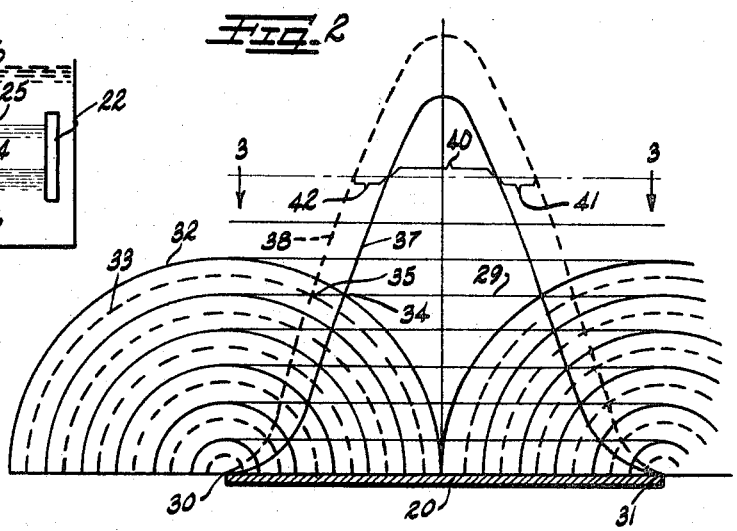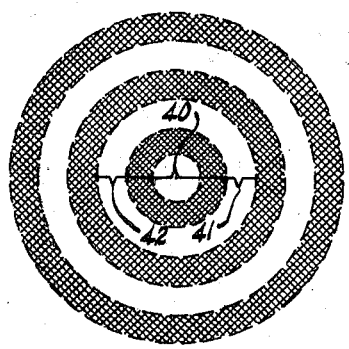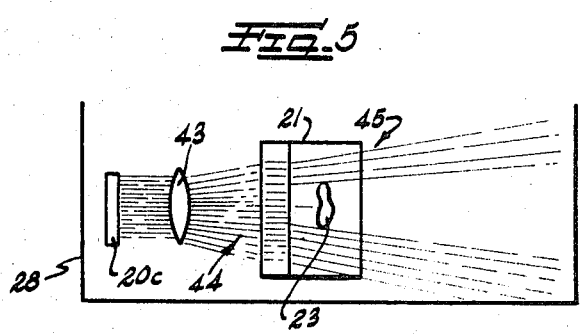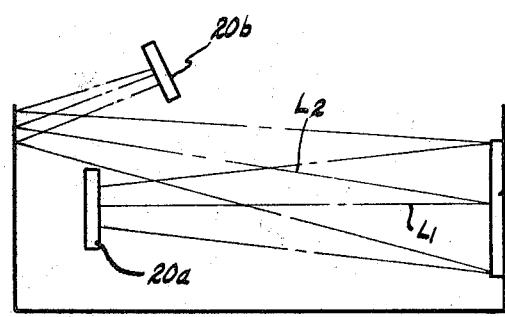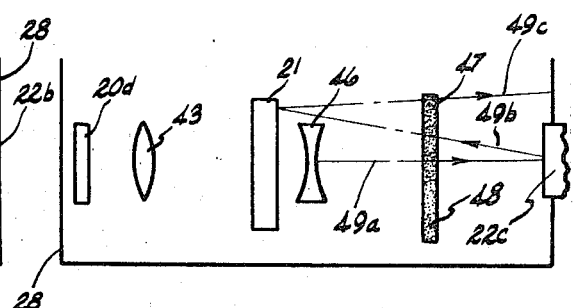
INVENTORS
RICHARD A. MUENOW
GERALD W. PLICE

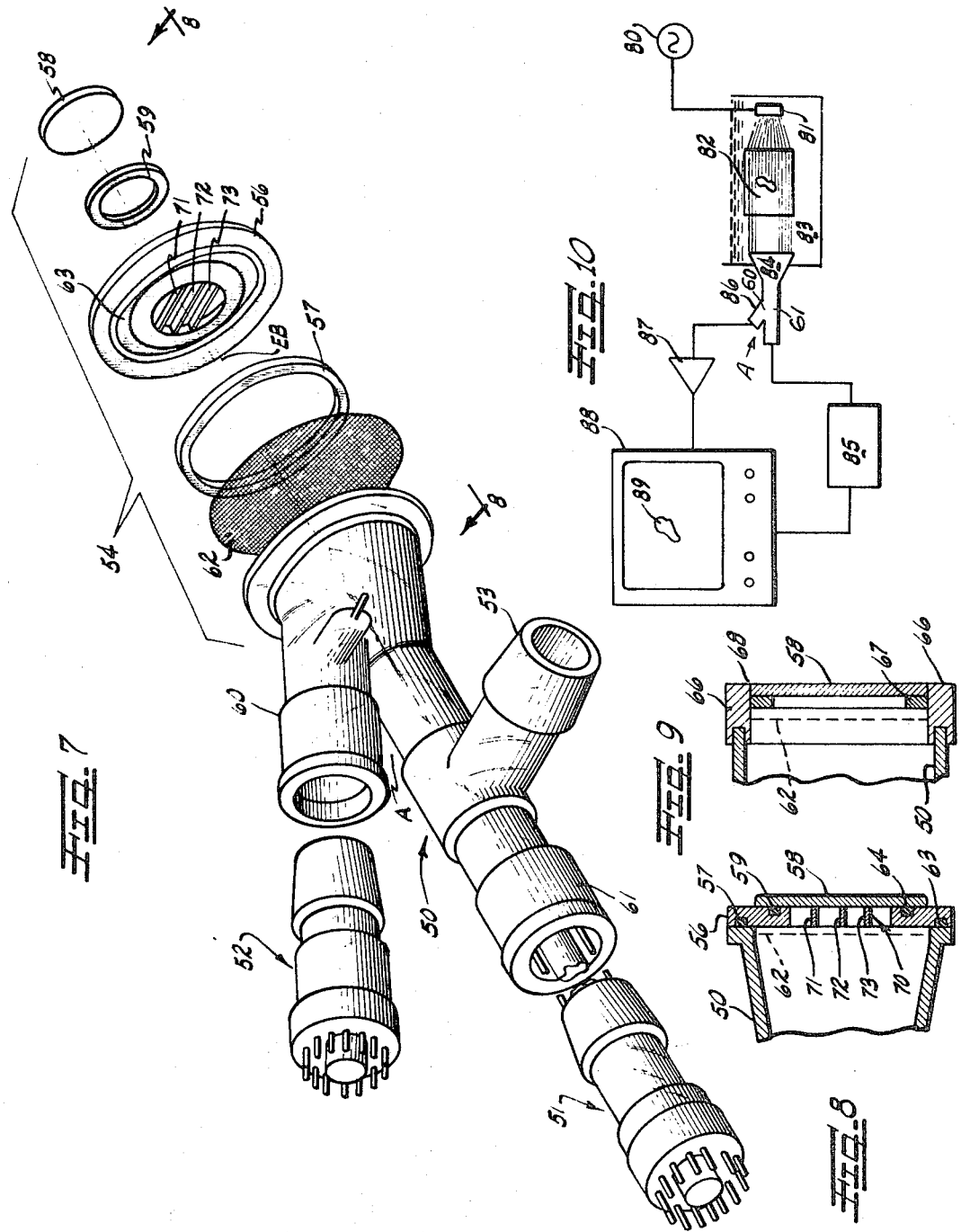

3,431,462
IMAGE CONVERSION CATHODE RAY TUBE WITH PIEZOELECTRIC FACE ELEMENT PROVIDED WITH RIGIDIFYING MEANS
Richard A. Muenow, Glenview, and Gerald W. Plice, Morton Grove, Ill., assignors to James Electronics, Inc., Chicago, Ill.
Filed July 1, 1966, Ser. No. 562,336
U.S. Cl. 315—55          12 Claims
Int. Cl. H01j 31/26

ABSTRACT OF THE DISCLOSURE

An ultrasonic testing system transmits sonic energy through an object under test to a piezoelectric element in the end of a cathod ray tube. Any discontinunity in the object under test appears as a corresponding variation in the piezoelectric potentials on the back of the element. These potentials are an output signal read out responsive to the scanning of an eletcron beam in the cathode ray tube. The signal which is so read out drives a TV monitor that displays an image of the discontinuity. This signal is improved by a material having a high loss of mechancial energy charactertistic placed at the point or points where objectionable noise may appear. To enable a use of larger piezoelectric elements without either a danger of breaking the element or a loss of sensitivity, the end of the tube has a special face plate assembly including mechancial supporting ribs which reinforce the element at the allowable limit of its motion.

---

This invention relates generally to the conversion of ultrasonic waves into observable images and especially—although not entriely—to the transducers for making such conversions.

Ultrasonic systems have many uses. One such use is to detect discontinuities and other flaws inside a solid object. For example, a void inside an object, such as a block of steel, may be detected by the sonic image which it casts on a piezoelectric element when ultrasonic waves are transmitted through the steel to the element.

This type of ultrasonic system offers an advantage because it provides an instantaneous display of a flaw image which can be read for size and shape. However, the systems presently in use do not offer the sensitivity and rapid recovery required to examine rapidly moving objects. Moreover, existing systems require accurate positioning and recording devices so that the test time becomes relatively long.

The ultrasonic waves used in these systems are generated by a transducing element which is electro acoustically coupled with one side of the object under test. Placed on the opposite side of the object is a second transducer which receives the ultrasonic waves after they have passed through the object. At least the second or receiving transducer is a piezoelectric element which generates electrical signals when its its surface is excited by the ultrasonic waves which have passed through the object. The electrical signals vary as a function of any discontinuities experienced by the sonic waves in the object. Therefore, this receiving transducer is the heart of the described type of ultransonic systems inasmuch as the signals which it generates are used to form the display which is the end product of the system.

The piezoelectric materials must have a proper thickness to give a fine resolution. Furthermore, the material must have substantial mechanical strength to withstand vacuum pressures if it is mounted on the end of a cathode ray tube or an acoustic camera tube. Moreover, the material may have to exert compression forces when it generates ultrasonic wave forms. Also the transducer is often used in liquids to insure a more efficient mechanical coupling between the transducer and the inspected object, thus introducing problems relating to sealing out the liquids.

To enable a further advance of the transducer design, some of the mechanical problems may be solved by improving the holders for the piezoelectric material. Among other things, these holders tend to establish the maximum power that can be produced or received by the transducer. If the piezoelectric material is held too rigidly, there is a substantial reduction in output. Also, the edges of the material may be damaged by the mounting. The problems become more severe as the diameter of the piezoelectric material increases and the holder is attached to the material at points which are removed from the points of stress.

Accordingly, an object of the invention is to provide new and improved transducers for converting ultrasonic waves into electrical signals which can produce video images.

A further object of the invention is to provide devices for holding unusually large piezoelectric elements used in such transducers.

Still another object is to attenuate unwanted reflections, standing waves, and other background noise resulting from a transmission of ultrasonic waves.

Yet another object of the invention is to provide an improved system for visually displaying an ultrasonic image. In this connection, an object is to increase the resolution and contrast of the display.

In accordance with one aspect of this invention, an ultrasonic piezoelectric transducer is constructed in the end of a cathode ray tube. The target end of the tube is made in the form of a face plate having a window with a piezoelectric element sealed therein. To allow for an increase in the diameter of the piezoelectric element, without requiring the element to be made thicker, a plurality of support ribs are formed in the window. These ribs do not inhibit or substantially distort any piezoelectric motion until the excursion reaches the allowable extermity of its motion. At that point the ribs more rigidly brace the element to prevent further motion and, therefore, possible damage. In order to reduce the shadow of the face plate ribs on the piezoelectric element, they are placed substantially parallel to the scan lines.

To prevent reflections, echoes, and other unwanted ultarsonic wave motion from building up into a background noise, the receiving transducer is shielded by means of a plate or curtain of resilient material loaded with heavy particles. Standing waves set the particles into motion. As they vibrate, these particles extract energy from the sonic spectrum at the resonant frequency, thereby attenuating the echoes.

These and other aspects of the invention are incorporated in the structure shown in the attached drawings wherein:

FIG. 1 is a schematic side view showing an ultrasonic flaw detector system of the type to which the invention is directed;

FIG. 2 is a graphical disclosure of how ultrasonic sound waves are propagated in the system of FIG. 1;

FIG. 3 is a top view, graphical disclosure taken from FIG. 2 to explain how ultrasonic sound waves are generated as a series of concentric pressure waves;

FIGS. 4 and 5 are two schematic side views showing two methods for making the ultrasonic wave front more uniform;

FIG. 6 is another schematic side view showing an attenuator for resonant ultrasonic wave fronts;

FIG. 7 is an exploded view, in perspective, showing a cathode ray tube having a piezoelectric transducer for receiving ultrasonic waves;

FIG. 8 is a cross-sectional view of the end of the cathode ray tube as it would look if cut in a plane taken along line 8—8 of FIG. 7 when the tube and face plate are sealed together;

FIG. 9 is an alternative disclosure showing another way of sealing the end of the tube; and FIG. 10 is a block diagram which shows how the tube may be incorporated into an ultrasonic scanning system.

The general principles of an ultrasonic flaw detector system are shown in FIG. 1. A piezoelectric transmitting transducer 20 is provided for generating ultrasonic waves directed toward an object 21 under test. The ultrasonic waves generated by the transducer 20 strike and travel through the object 21. After they emerge, the waves are received by a second or receiving piezoelectric transducer 22.

The ultrasonic waves striking transducer 22 are altered by any discontinuities inside the object 21. For example, FIG. 1 shows a block of steel having a void 23 therein. This void casts a shadow 24 or image of itself on the receiving transducer 22. The waves 25, 26 vibrate the transducer 22 to cause unequal electrical potentials to appear on the surface of the piezoelectric material 22. Hence, the charges on the piezoelectric surface appear in a pattern which includes an image of the flaw 23.

To increase efficiency and insure a full power transmission of ultrasonic waves from the transmitting transducer 20 through the object 21 under test to the receiving transducer 22, the entire assembly is enclosed by or operated in a coupling medium, such as water. For example, the entire arrangement may be immersed under a surface 27 of water in a container 28.

The operation of the device in FIG. 1 depends upon the modification in amplitude of sound propagation which occurs when the ultrasonic waves encounter a change in acoustic impedance. One example of such a modification is given by the void 23 from which the ultrasonic energy is reflected back toward the transmitting transducer 20 so that the ultrasonic energy does not reach the part of the receiving transducer which lies in the shadow of the void.

From this, it should be apparent that the energy which reaches the receiving transducer 22 causes it to vibrate in the same manner that the transmitting transducer 20 is vibrating except where the receiving transducer is in the shadow of a discontinuity inside the object under test. Therefore, the rear surface of the receiving transducer 22 assumes a nonlinear shape and forms unequal surface potentials. If this surface is then scanned by an electron beam, the energy on the rear surface of the transducer 22 may be converted into a signal which is fed into a TV monitor tube and there displayed as a video image.

High levels of sound energy striking the transducer 22 produce light areas on the TV monitor. Low levels of energy produce dark areas. Thus, an image of the void 23 appears as a dark area surrounded by light. In a particular embodiment of the invention, the ultrasonic energy was transmitted in the range of 0.9 mc. to 15 mc.; however, the invention is not limited thereto, it may increase to 100 mc. or more.

The transmitting transducer 20 includes a piezoelectric element sealed, with an air pocket formed behind it, in a water tight compartment. The air pocket reduces the back pressure on the piezoelectric element and prevents its self-damping. The element could be any one of several ceramics, quartz, barium titanate, or the like. Preferably, it may be in the order of two to four inches in diameter and a half wave lentgh thick.

In operation, the transmitting transducer 20 behaves as a plane piston radiator which may be thought of as an infinite number of point sources of vibrant energy. Every point source radiates ultrasonic energy equally in all directions. The energy decreases as the square of the distance from the point source to the wave front. Thus, the wave front from any given point source has a generally spherical shape.

These spherical wave fronts combine and produce a complex wave which may be represented as a series of parallel wave fronts moving outwardly from the plane-piston surface. By way of example, one such front is shown at 20 (FIG. 2).

The edges 30, 31 of the piezoelectric element 20 produce circular wave fronts as shown at 32, for example. These wave fronts are a series of alternating compressions and rarefactions which are areas of maximum pressure 32 and of minimum pressure 33, respectively. At point 34, the maximum pressure of wave front 29 reinforces the maximum pressure of wave front 32. At point 35, the minimum pressure or rarefaction from the edge point 30 contributes a minimum to the pressure front 29.

Graphically, then, maximum and minimum pressure points, such as 34, 35 may be connected together to give a plot of maximum and minimum pressure, as shown by the solid and dashed lines 37, 38, respectively. Since the surface of element 20 has two dimensions, the pressure curves 37, 38 are generated in three dimensions as they move outwardly through the coupling medium. If these curves are visualized as being horizontally cut along the line 3—3 to give a cross sectional view, there will be a series of concentric pressure rings, as shown in FIG. 3. By comparing FIGS. 2 and 3, it will be seen that each concentric ring represents a maximum or a minimum intensity of sound wave pressure. Thus, one problem is to convert this nonuniform pattern of concentric pressure rings into a uniform pressure field.

FIG. 4 shows one solution to the problem. The transmitting transducer is moved from point 20a to point 20b. This move increases the distance between transmitting and receiving transducers from the distance L1 to the distance L2. As the wave front travels over the extended distance L2, the divergence of the sound beam tends to widen and thus reduce the nonuniformities of the wave front.

Another way of bringing a higher degree of uniformity to the wave front is to incorporate an acoustical lens 43 into the system, as shown in FIG. 5. Preferably, the lens 43 will be a double convex device for spreading the ultrasonic image as shown at 44.

These and other sonic response characteristics tend to magnify the projected image and prevent the attainment of a truly sharp image. Hence, it may be desirable to keep the receiving transducer 22 as close as possible to the end of the object under test 21. However, a direct contact between the transducer and the object under test is not an attractive solution since it might tend to break the piezoelectric material, and it does not provide a sharp image.

According to the invention, these and other problems are solved by including a focusing lens 46 (FIG. 6) in front of the object under test 21. This lens focuses the sound waves on the face of the receiving transducer 22. Since acoustical lenses are well known, those skilled in the art will readily know how to construct them.

The ultrasonic waves transmitted through the system encounter many discontinuities and reflecting surfaces which cause background noise in the form of echoes, reflections, and the like. This background noise builds up into a state of equilibrium where it becomes resonant standing waves. The causes of this noise are not of particular importance. Echoes could form between the transmitting transducer 20d, and lens 43, between the lens 43 and object 21 under test, inside the object itself, between the end of the object 21 and the lens 46, and between the lens 46 and the receiving transducer 22c. Of these sources, by far the most important is the noise resulting from reflections between the lens 46 and the receiving transducer 22c.

To attenuate the background noise, a sound absorbing material 47 is positioned at any suitable location. For example, the exemplary location in FIG. 6 is between the lens 46 and the receiving transducer 22c. The attenuating material 47 might be either mounted directly on the transducer 22c itself or interposed in the couplant liquid. Thus, the disclosure of FIG. 6 is to be constructed as generically representing all suitable locations.

The attenuating material 47 may be a curtain or plate of resilient material loaded with massive metal particles 48, such as powdered tungsten or aluminum. The resilient material may be rubber, epoxy, or a suitable plastic. Generally speaking, the thickness of the plate 47 is a quarter wave length of the resonant frequency of the standing wave; in one case, a 2 mc. attenuator was one-seventh of an inch thick, made of silicone rubber, and loaded with particles at a ratio of 75% tungsten to 25% resilient material.

When ultrasonic vibrations are transmitted through the attenuator 47, the heavy particles are set into a sympathetic vibration. As the particles work against each other and against the resilience of the material in the plate 47, a large amount of energy is extracted from the system.

The ultrasonic wave 49a passing through the attenuator curtain 47 experiences a loss of energy. The major part of the remaining energy is absorbed on the face of the piezoelectric material 22c. Energy reflected as sonic wave 49b experiences an additional loss of energy as it passes back through attenuator 47. The re-reflected return wave 49c experiences yet another loss of energy. It is, therefore, obvious that before it returns to the receiving transducer 22c the background noise 49c is very much attenuated, as compared with the original wave 49a. Thus, the receiving transducer 22c receives sonic energy at an extremely high intensity from the first wave 49a relative to the low intensity sonic energy in the reflected wave 49c.

The receiving transducer 22c may be made from any of many suitable devices adapted for an area scan type of operation. Generally speaking, this transducer may be thought of as a mosaic of small crystals, each having a cross sectional area equal to the cross sectioned area of an electron beam used to scan the total crystal. The nature of this electron beam scanning arrangement may become more apparent from a study of FIGS. 7–9.

The major components of the ultrasonic scanning tube are shown in FIG. 7 as including a glass frame or envelope 50 enclosing an electron gun 51, an electron multiplier 52, and having a branch 53 for drawing a vacuum. The target end of the envelope is closed with an assembly 54 comprising face plate 56 sealed to the end of the tube 50 by an O-ring gasket 57 and to a piezoelectric element 58 by means of another O-ring gasket 59.

The glass frame 50 has a compartment 60 set at an angle A with respect to the stem 61 of the tube. The electron multiplier 52 is enclosed in the compartment 60. The electron gun 51 is enclosed in the stem 61. The angle A which is the angle between the center line of the tube body and the electron multiplier housing extension, is selected to offer the multiplier the greatest opportunity to collect secondary electrons emitted from the piezoelectric element. The angle is chosen so that the grid in front of the multiplier, which is at a higher potential than the secondary electron emitted from the piezoelectric crystal, is at an ideal angle and location of maximum collection. In one tube which was actually constructed, the angle A was in the range of 75° to 90°.

The electron gun 51 has a conventional design for providing an electron beam (EB). Electrostatic deflections plates (not shown) are used to sweep and position the electron beam. The remaining electron gun components (not shown in detail) include the usual filaments, cathode, control grid, and anodes. The preferred gun produces a spot having five thousandth of a square inch at the face of the tube. Conventional methods are used to seal the gun into the stem of the tube.

The electron multiplier 52 is of a conventional design. It is used here to collect secondary emission electrons and to give a signal which, after several stages of amplification, has adequate strength to drive a TV monitor. The multiplier 52 includes approximately ten dynodes (not shown) constructed to increase power by a factor of about $10^3$ for the entire multiplier. Preferably, each dynode is made from beryllium copper because it does not become contaminated after repeated exposures to the atmosphere.

An electron mesh or grid 62 may be enclosed in the tube at any suitable location to shield the multiplier from stray electrical charges. While the source of such charges is irrelevant to the invention, they might be expected to come from outside the tube. These stray charges would be objectionable if they interfere with a presentation of the sonic image on a TV monitor.

Means are provided for sealing the face plate to the tube and the piezoelectric element to the face plate. Two different structures for providing this means are shown in FIGS. 8 and 9.

In greater detail, the tube 50 is flared at one end to provide a relatively wide, flat face surface. The O-ring 57 is placed between this face surface and an annular groove 63 in the face plate 56. The O-ring 59 is placed between another annular groove 64 on the other side of the face plate and the piezoelectric element 58. Vacuum grease is used to complete the seal and then a vacuum is drawn to pull the face plate element in against the end of the tube. Any suitable keying or indexing means (not shown) may be provided to help position and align the face plate and piezoelectric element.

In the alternative embodiment of FIG. 9, a metal sealing (such as Kovar metal) ring 66 is sealed to the end of the glass envelope 50 with a usual glass to metal seal. To support the back of the piezoelectric element 58, a copper retaining ring 67 is welded inside the metal sealing ring. Finally, a thin circular foil element of any suitable material, such as copper is soldered from the metal sealing ring 66 to the piezoelectric element 58. In one embodiment, an indium solder having a low temperature melting point was used. Although FIG. 9 does not show the face plate, window, and ribs, it should be understood that the invention contemplates a use of such items. The decision of when to use and when to omit the face plate turns primarily on the diameter of the element 58.

The holder used to brace the piezoelectric element does not interfere significantly with the desired mechanical excursions. In greater detail, the face plate 56 has a window 70 with three ribs 71, 72, 73 therein. The ribs serve the dual functions of providing a grid between the piezoelectric element and the tube elements and providing a mechanical support which braces the piezoelectric element at the extremity of its mechanical excursion. These ribs and the piezoelectric element experience mechanical movement as a unit.

The ribs are arranged in a geometric pattern such that they cast a minimum shadow on the sonic image. More particularly, the face plate 56, which could be made from aluminum, is provided with a large window having three stiffening ribs, each of which is a thin but wide beam-like member. These ribs are set with their thin dimensions (perhaps .030" thick) facing into the stream of electrons which forms the electron beam. Thus, the normal projection of the ribs on the piezoelectric element casts a shadow which has a minimum size. In their wide dimensions, the ribs brace the piezoelectric element by adding mechanical strength to the element when it is deflected. The dimensions are such that the piezoelectric element may take wanted mechanical motion but may not go beyond a safe limit. To further minimize the shadow which the ribs cast on the piezoelectric element, they may be set at an angle of about 6° to 7° off the perpendicular of the electron beam. Thus, they will not intercept any full scan line. These ribs may also be used to form a reticle for measuring the size of the flaw.

An advantage of this arrangement is that the piezoelectric element may be made larger than it could be made heretofore. There is no need for either increasing the thickness of the element or producing a mechanically weaker assembly. In one tube which was actually constructed, the piezoelectric element was at least two inches in diameter.

During the process of manufacturing a sealed tube assembly, the gases and other volatile constituents are driven off the various elements used in the tube. The metal parts are hydrogen fired immediately before they are installed in the tube. The piezoelectric element is coated around its edges with "liquid platinum" and then fired to approximately 1000° F. This coating and firing process is repeated to cover the edges with two to four coats of platinum.

Then, the piezoelectric element is sealed into the assembly. More specifically, in the embodiment of FIG. 8, the elements are assembled and then a vacuum is drawn. In the FIG. 9 embodiment, the thin foil 68 on the Kovar element 66 is sealed to element 58 with the low melting point indium solder. This seal allows the desired degree of flexibility in the piezoelectric element while maintaining the desired mechanical seal. This mechanical seal is especially useful when the transducer is working in a liquid.

Those skilled in the art will readily perceive many uses for the invention. By way of example, FIG. 10 is included here as a closed circuit TV used for an on line, non-destructive, production testing device. Although the acoustical lens, attenuator, and other parts have been omitted from FIG. 10 for simplicity, it should be understood that they may be included as required.

An ultrasonic generator 80 drives a transmitting transducer 81 directed at an object 82 under test. The ultrasonic sound waves travel from the transducer 81 through liquid 83 and the object 82 to the receiving transducer 84. These sound waves are modified by any flaw in the object 82 and then cause mechanical excursions which the piezoelectric element converts into electrical signals.

A closed circuit television system includes a focusing and deflecting circuit 85 which sweeps the electron beam over the piezoelectric element. The electron multiplier 86 detects signals resulting from the scan and feeds them through a video amplifier 87 to a TV monitor 88. The monitor 88 then displays the image 89 of the flaw. Timing controls on the ultrasonic generator 80 fill provide a means for adjusting the system to produce a sharper image for any given object under test.

The attached drawing and foregoing specification show and describe preferred embodiments of the invention. However, the claims are not to be construed as necessarily limited thereto. Quite the contrary, they are to be construed broadly to cover all equivalents reasonably falling within the true scope of the invention.

What is claimed is:

1. An ultrasonic image conversion device comprising a cathode ray tube having a piezoelectric element held against the end of the tube which is struck by the electron beam, and means comprising a holder with a plurality of ribs for limiting the mechanical motion of said piezoelectric element, said element being free to experience virtually an uninhibited mechanical excursion when said motion is less than the allowable extremity of said piezoelectric element excursion.

2. The image conversion device of claim 1 and means for increasing the attenuation of ultrasonic waves falling on said element, said attenuation means comprising resilient means positioned adjacent said element with respect to the resonant vibrations of standing waves.

3. The image conversion device of claim 2 wherein said resilient means comprises elastic material loaded with heavy particles.

4. The image conversion device of claim 1 said piezoelectric element being held against the end of said tube is associated with a face plate having a window therein, an elastic O-ring and vacuum grease combination for sealing said face plate against the end of said tube, another elastic O-ring and vacuum grease combination for sealing said piezoelectric elements against said window, said seal being accomipilshed by drawing a vacuum in said tube.

5. The image conversion device of claim 4 wherein said ribs are associated with said window for holding said element in a supported condition and stopping the mechanical motion of the element at the extremity of its allowable excursion without substantially affecting the useful mechanical motion of said element before said motion reaches said extremity, and means for causing said electran beam to scan the surface of said element, said ribs being situated in said window to cast a minimum shadow upon said piezoelectric element when it is scanned by said beam.

6. The image conversion device of claim 5 wherein said ribs are a plurality of thin, horizontally disposed members set with their thin dimension facing into the stream of electrons which form said electron beam, said ribs being oriented approximately parallel to a scan line.

7. The image conversion device of claim 1 wherein said ribs form a grid at the back of said element.

8. The image conversion device of claim 1 wherein the shadow of said ribs on said element forms a recticle for measuring the shadows of defects falling on said element.

9. The image conversion device of claim 1 and means responsive to signals derived when said beam scans said element for visually displaying an image produced by said excursion of said element.

10. An ultrasonic transducer comprising a glass frame having a stem at one end and an open face at the other end, a cathode ray gun sealed in said stem, a branch projecting outwardly from said stem and forming an acute angle with respect to the part of the stem having the cathode ray gun sealed therein, a face plate assembly including a piezoelectric element for sealing said open face, said face plate having a window with said element sealed therein and positioned to be scanned by an electron beam from said cathode ray gun, said face plate further including a plurality of ribs positioned substantially parallel to the scan lines of said electron beam with at least one of the ribs being skewed with respect to said scan lines by an angle of less than 10° and means in said branch for developing an electrical signal jointly responsive to said electron beam and the piezoelectrical effects occurring when the element experiences mechanical excursions.

11. An ultrasonic transducer comprising a glass frame having a stem at one end and an open face at the other end, a cathode ray gun sealed in said stem, a branch projecting outwardly from said stem and forming an acute angle with respect to the part of the stem having the cathode ray gun sealed therein, a face plate assembly including a piezoelectric element for sealing said open face, said face plate having a window with said element sealed therein and positioned to be scanned by an electron beam from said cathode ray gun, means in said branch for developing an electrical signal jointly responsive to said electron beam and the piezoelectrical effects occurring when the element experiences mechanical excursions, and resilient means loaded with heavy particles positioned adjacent sail element for attenuating the sonic energy striking said element.

12. An ultrasonic transducer comprising a glass frame having a stem at one end and an open face at the other end, a cathode ray gun sealed in said stem, a branch projecting outwardly from said stem and forming an acute angle with respect to the part of the stem having the cathode ray gun sealed therein, a face plate assembly including a piezoelectric elements for sealing said open face, said face plate having a window with said element sealed therein and positioned to be scanned by an electron beam from said cathode ray gun, a plurality of ribs in said face plate for bracing said eleement at the allowable extremity of its mechanical excursion forming a grid at the back of said element, and providing a recticle for measuring the dimensions of an image falling on said element, and means in said branch for developing an electrical signal jointly responsive to said electron beam and the piezoelectrical effects occurring when the element experiences mechanical excursions.

References Cited

UNITED STATES PATENTS

| 2,323,030 | 6/1943 | Grueizmacher | 310—9.4 X |
| 2,840,755 | 6/1958 | Longini | 313—68 |
| 2,919,574 | 1/1960 | Fotland | 73—67.6 |
| 3,054,004 | 9/1962 | Lord | 310—9.4 |
| 3,106,660 | 10/1963 | Sheldon | 313—89 |
| 3,213,675 | 10/1965 | Goldman | 73—76.5 |

JAMES W. LAWRENCE, *Primary Examiner.*

V. LAFRANCHI, *Assistant Examiner.*

U.S. Cl. X.R.

73—67.5; 310—8.2, 9.4; 313—89, 311, 313; 315—10